No. 885,613. PATENTED APR. 21, 1908.
J. HAMILTON.
DUMPING BUCKET.
APPLICATION FILED AUG. 1, 1907.
2 SHEETS—SHEET 1.
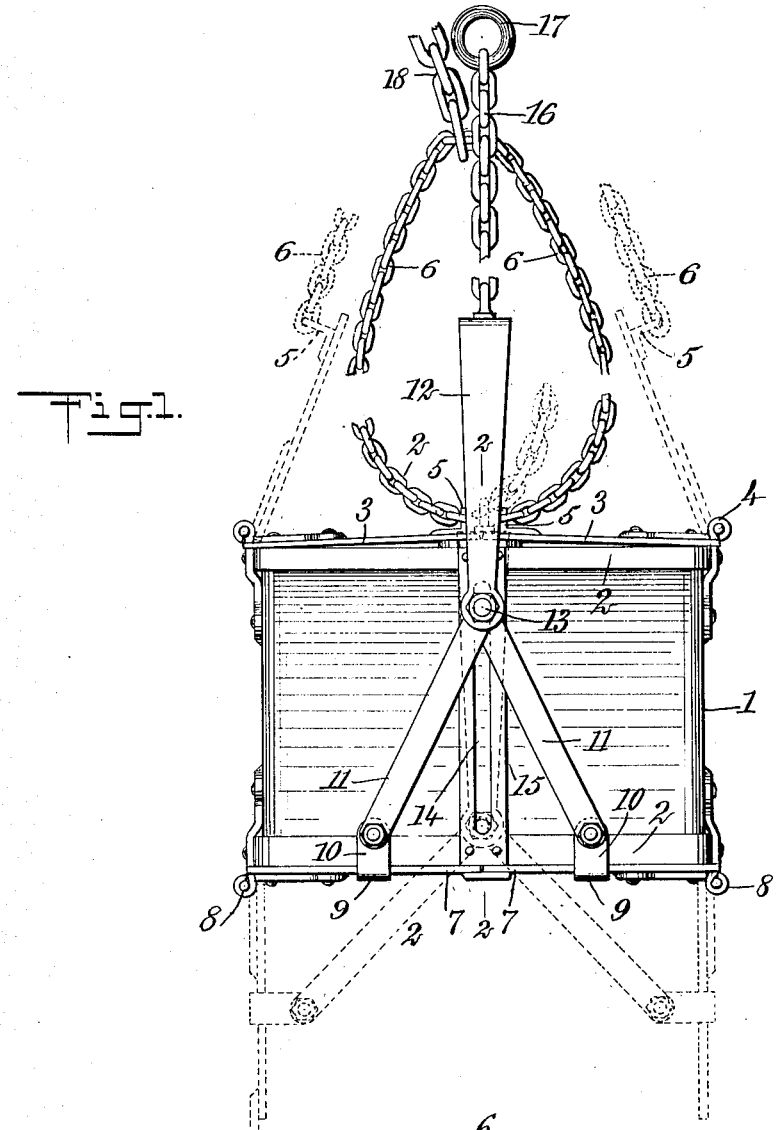
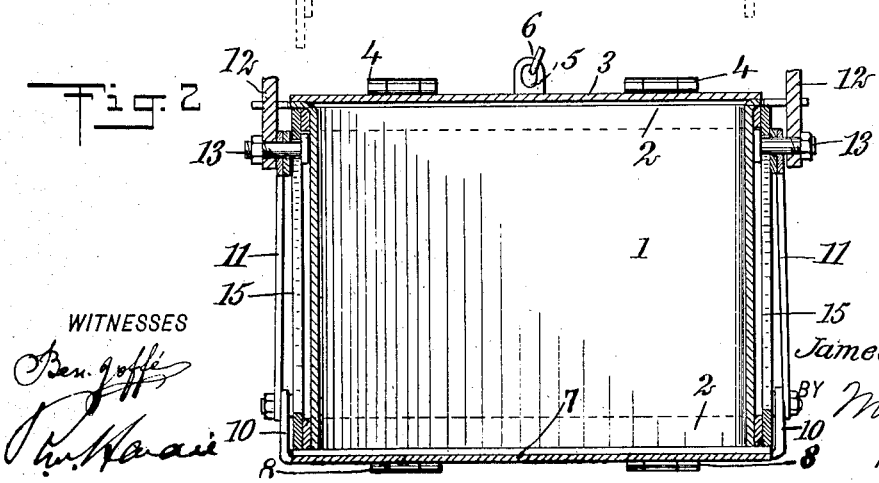
WITNESSES
INVENTOR
James Hamilton
BY Munn & Co
ATTORNEYS No. 885,613. PATENTED APR. 21, 1908.
J. HAMILTON.
DUMPING BUCKET.
APPLICATION FILED AUG. 1, 1907.
2 SHEETS—SHEET 2.
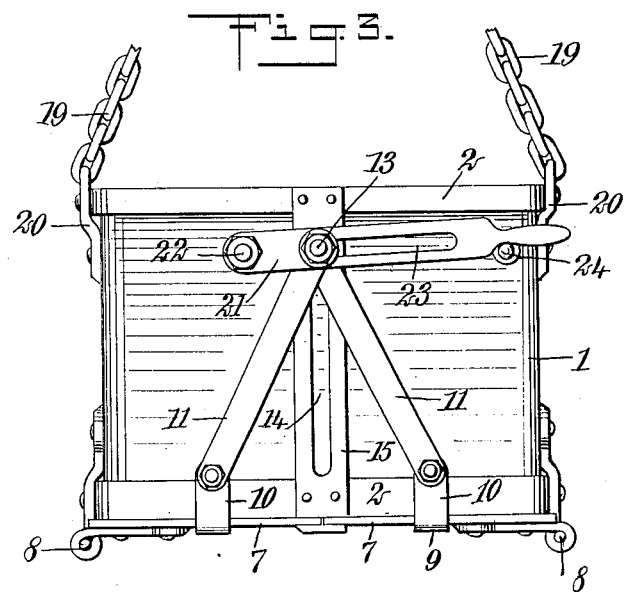
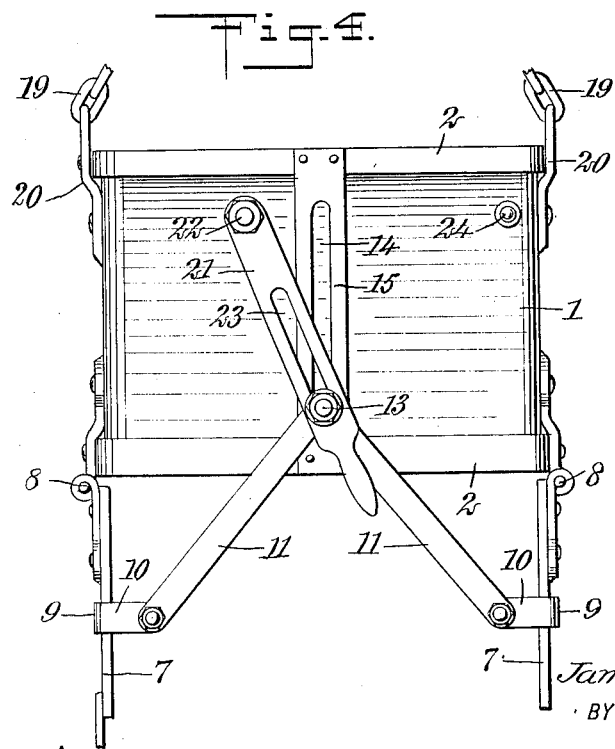
WITNESSES
Ben. Joffé
INVENTOR
James Hamilton
BY
ATTORNEYS

UNITED STATES PATENT OFFICE.

JAMES HAMILTON, OF NEW YORK, N. Y.

DUMPING-BUCKET.

No. 885,613.  Specification of Letters Patent.  Patented April 21, 1908.

Application filed August 1, 1907. Serial No. 386,644.

*To all whom it may concern:*

Be it known that I, JAMES HAMILTON, a citizen of the United States, and a resident of the city of New York, borough of Brooklyn, in the county of Kings and State of New York, have invented a new and Improved Dumping-Bucket, of which the following is a full, clear, and exact description.

This invention relates to dumping buckets designed especially for sub-marine use, and has for its primary object to provide a suitable bucket simple in construction, effective in operation and durable in use, adapted to contain cement and other substances, to hold said material securely in the bucket while it is lowered under the water, and to readily dump the contents of the bucket when desired.

Other objects relating to the specific construction and special arrangement of the several parts of my invention will be understood from the accompanying drawings and following description, in which drawings Figure 1 is an end elevation of a bucket embodying my invention showing in dotted lines the position assumed by the upper and lower trap doors when open; Fig. 2 is a vertical section taken on the line 2—2 of Fig. 1; Fig. 3 is an end elevation of a modification of my invention; and Fig. 4 is an end elevation of the bucket shown in Fig. 3 with the trap doors opened.

Like characters of reference designate like parts in all the views.

As illustrated in the drawings, 1 represents the body of the bucket, preferably provided on its upper and lower ends with re-inforcing bands 2 extending around the ends of the body of the bucket. Trap doors 3 are secured to the upper end of the bucket by means of hinges 4 and the inner or free edges of the doors may be provided with lugs 5 having eyes adapted to be connected with the ends of a bridle chain 6. The bucket is provided with similar trap doors 7 connected by means of hinges 8 to the lower portion of the bucket, and these doors are preferably provided with transverse bars 9 having upturned ends 10 to which are pivotally attached the lower ends of links 11. The upper ends of these links converge toward each other and are connected with the ends of a bail 12 by means of studs 13, which also have a sliding engagement with slots 14 formed in guideways 15, these guideways being riveted or otherwise fixedly attached to the ends of the bucket. A supporting chain or cable 16 is connected with the bail 12 and provided with a ring 17 or other suitable device, by means of which the bucket may be readily attached to a hoisting chain or cable. A dumping line 18, or other suitable means, is connected with the upper central portion of the bridle chain 6 for the purpose of raising the top trap doors and dumping the bucket when desired.

When the bucket is designed for use on land, the upper doors 3 may be dispensed with and the bucket supported by means of chains or cables 19 attached to stirrups 20 rigidly secured to the body of the bucket. The bail 12, and the means attached thereto for supporting the bucket, is also in such case dispensed with, and a lever 21 pivotally secured by any suitable means. such as a bolt 22, to the side of the bucket. The lever is provided with a slot 23 which engages the bolt 13, and a keeper 24 is secured to the bucket in line with the free end of the lever 21, so as to hold that end of the lever securely in position when the doors of the bucket are closed. This keeper may consist of a stud or a sliding bolt or any other suitable means, adapted to support the free end of the lever in position and permit said end to be released therefrom at will. When the device is in use for sub-marine work, the bucket is sustained by means of the chain or cable 16 connected with the bail 12, and by means of said bail and the links 11 with the lower trap doors 7, thereby holding the doors in a closed position. The material to be used is then placed within the bucket, the upper doors 3 being first raised by means of the bridle chain 6, which is preferably connected with the upper doors independently of the supporting cable 16. After the material has been placed within the bucket the top doors 3 are closed and the bucket lowered into the water to the place desired. The bucket is dumped by means of the tripping cable 18, which raises the bridle chain 6 and opens the upper doors 3. When the upper doors are so opened, the entire weight of the bucket is supported on the tripping cable 18, and the cable connected with the chain 16 is loosened so as to relieve said chain from the weight of the bucket and its contents, and when said cable is loosened the weight of the bucket dumps itself because of the material in the bucket forcing open the lower doors thereof. After the bucket has been dumped in this manner, the tripping cable 18 is released and the bucket supported on the cable connected with the chain 16. The upward movement of the bucket as it is raised in the water closes the upper doors 3, while the pull on the chain 16 in raising the bucket closes the lower doors 7 because of the connection between said chain and doors, consisting of the bail 12 and the connecting links 11. After the bucket has been raised above the water, it may be refilled and operated in the manner already described.

When the construction shown in Figs. 3 and 4 is used for land work, the bucket is filled in the usual manner, and conducted by means of suitable hoisting apparatus to the place desired, and is dumped by releasing the free end of the lever 21 from the keeper 24. When that end of the lever is released from the keeper, the weight of the material in the bucket forces downward the lower doors 7 and spreads the links 11, as shown in Fig. 1. After the bucket is dumped, the lower doors are closed by raising the free end of the lever 21, which carries with it the links 11 and doors 7 connected therewith, and the parts are held in position by bringing the free end of the lever in engagement with the keeper 24. If desired, especially for small buckets used for land purposes, one of the doors and connecting link may be dispensed with and the remaining door extended across the entire bottom of the bucket.

Other changes may also be made in constructing a bucket in accordance with my invention, without departing from the scope thereof.

Having thus described my invention, what I claim as new and desire to secure by Letters Patent is:

1. A dumping bucket comprising a body, trap doors hinged to the lower portion of said body, vertical guideways secured to said body, links secured at their lower end to said trap doors, and slidingly connected at their upper end with said guideways, a bail connected with the upper end of said links, a supporting connection attached to said bail, trap doors hinged to the upper portion of said body, and suspending means connected with said upper doors.

2. A dumping bucket comprising a body, trap doors hinged to the lower portion of said body, vertical guideways secured to the opposite sides of said body, links secured at their lower end to said doors and having a sliding engagement with said guideways, a bail connected with the upper end of said links, supporting means connected therewith, doors hinged to the upper part of said body, and supporting means connected with the free ends of the upper doors independently of the first named supporting means.

3. A dumping bucket comprising a body, trap doors hinged to the lower portion of said body, links pivotally connected at their lower ends to said doors, a bail connected with the upper ends of said links, a supporting connection attached to said bail, trap doors hinged to the upper portion of said body, and supporting means connected with the free ends of the upper doors independently of the first named supporting means.

In testimony whereof I have signed my name to this specification in the presence of two subscribing witnesses.

JAMES HAMILTON. [L. S.]

Witnesses:
  JAMES W. HAMILTON,
  L. DOWE.